United States Patent
Patel et al.

(10) Patent No.: US 6,839,871 B2
(45) Date of Patent: Jan. 4, 2005

(54) METHOD FOR TRANSPARENT MULTIPLEXING OF SONET/ SDH STREAMS

(75) Inventors: Naimish Patel, North Andover, MA (US); Richard A. Barry, Brookline, MA (US); Paolo Narvaez, Mountain View, CA (US); Anthony Chi-Kong Kam, Cambridge, MA (US)

(73) Assignee: Sycamore Networks, Inc., Chelmsford, MA (US)

( * ) Notice: Subject to any disclaimer, the term of this patent is extended or adjusted under 35 U.S.C. 154(b) by 898 days.

(21) Appl. No.: 09/779,190

(22) Filed: Feb. 8, 2001

(65) Prior Publication Data

US 2002/0107975 A1 Aug. 8, 2002

(51) Int. Cl.$^7$ .................................................. G06F 11/00
(52) U.S. Cl. ........................ 714/707; 714/747; 714/800
(58) Field of Search ............................. 370/505, 395.2, 370/375, 254, 466, 242; 398/50; 714/747, 800, 707

(56) References Cited

U.S. PATENT DOCUMENTS

| | | | | |
|---|---|---|---|---|
| 4,010,325 A | * | 3/1977 | Kline ........................ 370/505 |
| 4,967,405 A | * | 10/1990 | Upp et al. .................... 398/50 |
| 5,568,486 A | * | 10/1996 | Huscroft et al. ......... 370/395.2 |
| 5,923,653 A | * | 7/1999 | Denton ........................ 370/375 |
| 6,041,043 A | * | 3/2000 | Denton et al. ............... 370/254 |
| 6,058,119 A | * | 5/2000 | Engbersen et al. ......... 370/466 |
| 6,343,068 B1 | * | 1/2002 | Yamamoto et al. ......... 370/242 |

* cited by examiner

Primary Examiner—David Ton
(74) Attorney, Agent, or Firm—Weingarten, Schurgin, Gagnebin & Lebovici LLP (57) ABSTRACT

Indicia are provided to a client of Out-of-Frame errors and message bit parity errors that occur during the transmission of a message through a network, wherein the message includes the client data multiplexed with other data and formatted into a message that includes a plurality of transport overhead bytes. The transport overhead bytes of the multiplexed can include both defined bytes and undefined bytes. Predetermined bytes in the transport overhead may be used to store indicia of errors that are detected during the message transmission. These predetermined bytes are read by the client at the egress of the network. The transport overhead may contain both a section overhead portion and a line overhead portion and the predetermined bytes may be encoded in either a subset of the section or line overhead bytes. In addition, the indicia of errors may be encoded in an undefined portion of the section or line overhead. Alternatively, a portion of the section or line overhead that is defined may be redefined and used to store the encoded error indicia

14 Claims, 8 Drawing Sheets

(PRIOR ART)

*FIG. 1*

(PRIOR ART)

*FIG. 2*

(PRIOR ART)

*FIG. 3*

(PRIOR ART)

METHOD FOR TRANSPARENT MULTIPLEXING OF SONET/SDH STREAMS

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

This invention relates generally to multiplexing data into a message and transmitting the message within a data transmission network.

The Synchronous Optical Network (SONET) is a data communications standard and protocol that standardizes the rates and formats of different types of data communicating between different networks. SONET allows data of different formats such as DS1, DS2, and video to be combined together in a common data message format that can be multiplexed with other messages and transmitted together over a single fiber optic line. The SONET standard allows the multiplexing of these lower rate signals directly into a higher speed data stream without having intermediate stages of multiplexing.

Figure 1:
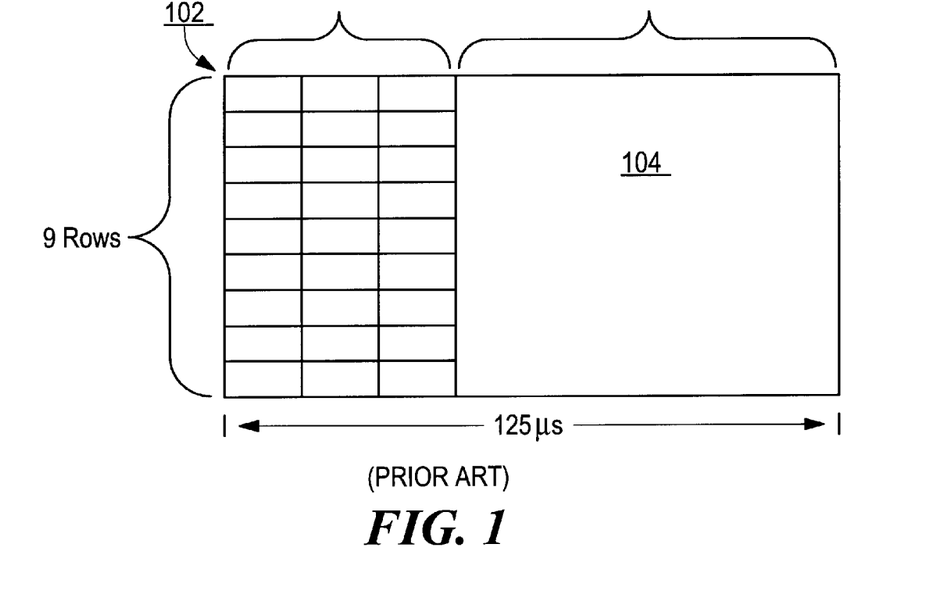
FIG. 1 is a schematic representation of a STS-1 message frame as known in the art.

As illustrated in FIG. 1, the basic SONET message 100 known as an STS-1 has a transmission time of 125 $\mu$-seconds and includes 9 rows by 90 columns of data, divided into two parts. The first part is the transport overhead data 102, which includes the data in columns 1–3. The transport overhead includes a section overhead portion and a line overhead portion. The section overhead includes framing data that is used to determine if an out-of-frame error occurs. The line overhead portion includes parity check bytes that are the results of a parity calculation performed on the message.

The second part of the STS-1 message is the payload data 104, which includes the data in columns 4–90. An additional one column of overhead (not shown), referred to as the path overhead, is also provided in the first column of the payload data 104. Thus each SONET message has only 4.44% of overhead in any message. The SONET standard requires that no additional overhead data is added to the SONET messages as they are multiplexed together N SONET STS-1 messages are multiplexed together into an STS-N message using byte interleaving, such that each byte of each individual STS-1 message is visible within the multiplexed STS-N message. In this way the entire message does not need to be de-multiplexed in order to access an individual STS-1 message. However, when an STS-1 message is added or removed from the multiplexed STS-N message, new line and section overhead bytes must be regenerated since some message parameters such as framing and parity may have changed during the multiplexing operations. Because of this, error data contained in the transport overhead bytes may be lost during this process. Thus, data relating to the bit errors that occur as the message passes through the SONET network, or data relating to any out-of-frame error conditions that occur during the transmission of data through the SONET network will not necessarily be available to the client when they receive the message at the egress of the network.

Therefore it would be desirable to provide the capability to preserve some predetermined error data during the transmission of the client data through a SONET network.

BRIEF SUMMARY OF THE INVENTION

A method for indicating that errors have occurred during the transmission of a client message is disclosed. In one embodiment, a plurality of client data is combined with other data and formatted as a message that includes a plurality of transport overhead bytes. The transport overhead bytes can include a section overhead portion and a line overhead portion, and both the section and line overhead portions may include both a plurality of defined and undefined bytes. An indicia portion of the transport overhead bytes is selected, and a predetermined pattern is written that indicates that no out-of-frame error has occurred. The message is transmitted through the network and if an out-of-frame error is detected at a node within the network, the indicia portion of the transport overhead is set to a second predetermined pattern that indicates that an out-of-frame error has occurred. In one aspect, the indicia portion of the transport overhead is contained within the section overhead portion and is a plurality of undefined bytes. In another aspect, the indicia portion of the transport overhead is contained within the section overhead portion and occupies a plurality of defined bytes, in particular a subset of the plurality of framing bytes. In this aspect, other framing bytes are set into a predetermined framing pattern, and the indicia portion is set to the first predetermined pattern indicative that no out-of-frame error has occurred. As described above, if an out-of-frame error occurs during the transmission of the message through the network, the indicia portion of the framing bytes are set to the second predetermined pattern. When the message is received, the client reads the indicia portion of the transport overhead and determines if an out-of-frame error has occurred.

In another error-indicating method errors that occur during transmission of the message through the network that are detected by a bit parity check are aggregated and provided to the client. In one aspect, the transport overhead includes at least one parity check byte that can be written to represent the results of the bit parity check. As the message is formatted, a parity check is performed and the results are written to the parity check byte. At each node within the network that includes the capability to perform the bit parity check of the message that the message passes through, the parity check byte is read and an error mask is made. A new parity check of the message is performed and an Exclusive OR operation is performed on the results of the new parity check and the error mask. The results of the Exclusive OR operation are written to the parity check byte. When the egress node receives the message, the client reads the parity check byte and can determine if any errors have occurred and if so, how many errors occurred during the transmission of the client data through the network.

In another aspect, when the message is formatted and the parity check performed, an error mask is determined based on the parity check results and the error mask is stored in a transport overhead byte, and may be stored in a undefined byte within the line overhead portion of the transport overhead. When the client receives the message, the current parity check byte is read and is provided as one input to an Exclusive OR, the error mask is read from the transport overhead and provided as a second input to the Exclusive OR, and a new parity check is performed on the message and the new parity check results are provided as a third input to the Exclusive OR. The results of the Exclusive OR are provided to the client as the parity check results of the transmission of the client data through the network.

BRIEF DESCRIPTION OF THE SEVERAL VIEWS OF THE DRAWING

The invention will be more fully understood by reference to the following Detailed Description of the Invention in conjunction with the Drawing of which.

DETAILED DESCRIPTION OF THE INVENTION

SONET is a synchronous optical network that includes a set of standards defining the rates and formats for transferring data over an optical network and are contained within the ANSI specifications: ANSI.T1.105, ANSI.T1.106, and ANSI.T1.117. SONET defines the rates, formats, the physical layer, the network element architectural features, and network operational criteria for optical networks that transfer data between various data transmission systems.

SONET has adopted a frame length standard of 125 micro-seconds and has a basic message frame that is referred to as a synchronous transport signal (STS-1) that is illustrated in FIG. 1. The basic frame structure 100 has a 9 row by 90 column message that includes a transport head portion 102 that includes the signaling and protocol information, and a payload portion 104 that includes the information that is to be sent via the message. The transport header portion 102 includes the first 3 columns of 9 rows while the payload data portion that includes the message data is contained within the remaining 87 columns by 9 rows. When N-messages are multiplexed into a single data stream, the resulting message is referred to as a STS-N message.

Figure 2:
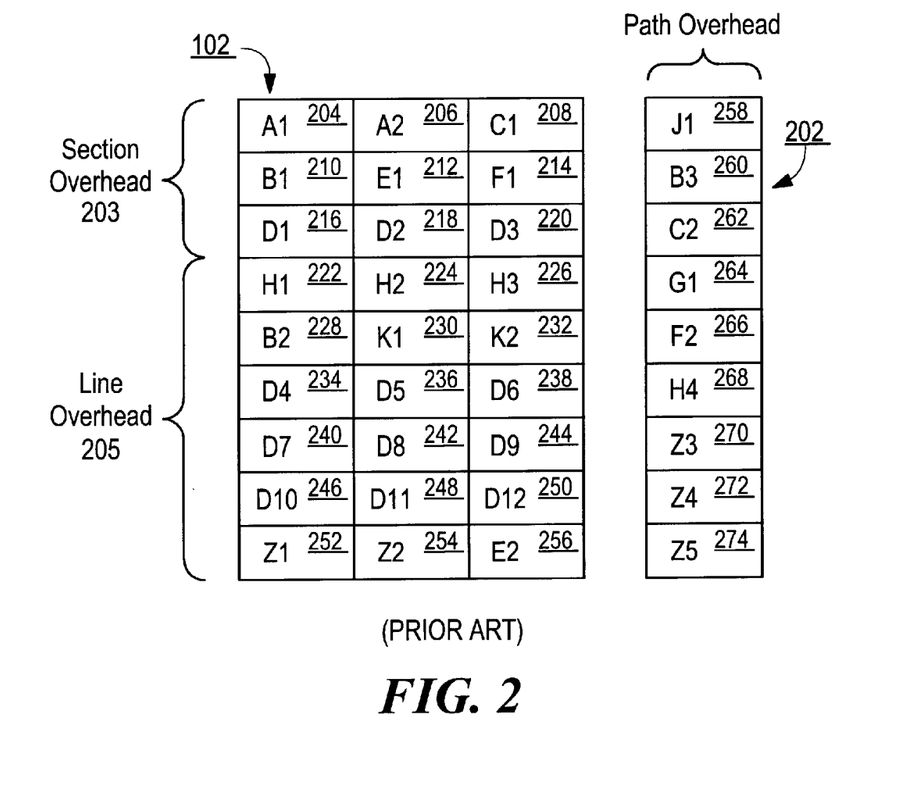
FIG. 2 is a schematic representation of the transport overhead bytes of an STS-1 message.

FIG. 2 illustrates the various bytes that make-up the transport overhead 102. The transport overhead 102 includes a plurality of bytes that perform various functions that are necessary for the transmission of the data over a SONET network. The section overhead 203 includes the first three rows of bytes and provide overhead data necessary for section terminating equipment to properly receive, frame, process, and transmit the STS-N messages.

Framing bytes A1 and A2, 204 and 206 respectively are a part of every STS-1 message and have a predetermined value that is used to indicate the beginning of the message frame. When four (4) consecutive error frame patterns are received, an out of frame (OOF) has occurred. After an OOF, only after 2 consecutive error free framing patterns are recognized is an in-frame condition is declared.

Byte 208, C1, is a number assigned to each STS-1 signal that has been multiplexed into an STS-N signal. Byte 210, B1, is allocated for section error monitoring. The B1 byte is a parity byte calculated over all of the bits of the previous STS-N frame, after scrambling, using a bit interleaving parity 8 (BIP-8) code with even parity. Each piece of section equipment calculates the BIP-8 parity of the current STS-N frame and compares it with the B1 byte received from the first STS-1 of the next STS-N frame. If the values match no error has occurred during the transmission between the nodes. If the values do not match, an error has occurred during transmission. When the error rate reaches a threshold level, an alarm indicator is then set. Byte 212, E1, is an order wire byte and is allocated as a local order wire channel for voice communications between section equipment. Since one byte of a SONET frame is 8 bits, and a frame is sent every 125 $\mu$-seconds the data rate of a single byte in the STS-1 message will be 64 kilobits per second. This value is the same rate as a typical voice frequency signal and is suitable for use as an orderwire. A section user channel, byte 214, F1, is set aside for a client or other user purpose. The F1 byte is passed from one section level entity to another and is to be terminated at all section equipment. Bytes D1, D2, and D3, which are bytes 216, 218, and 220 respectively, are allocated for use as a data communication channel for alarms, maintenance, control, monitoring, and administration and communication between section terminating equipment.

The line overhead bytes 205 include rows 4 through 9, columns 1 through 3, and provide line data necessary for line terminating equipment to properly receive, multiplex or cross-connect, and process the STS-N messages. The line overhead bytes 205 begin with bytes 222, 224, and 226 which are pointer bytes H1, H2, and H3 respectively. These pointer bytes are used to indicate the offset in bytes between the pointer byte and the first byte of the STS-1 payload. This is necessary since the overhead bytes are framed within a single frame, but the payload bytes may float among two STS-1message frames. Thus, as an STS-1 message is dropped from an STS-N message, new overhead information will need to be generated to account for new message parameters.

Byte B2, byte 228, is used for line error monitoring. The B2 byte is a interleaving parity 8 (BIP-8) parity byte calculated over all the bits of line overhead and the STS-1 payload envelope of the previous STS-1 frame before scrambling. Bytes K1 and K2, 230 and 232 respectively are allocated for automatic protection switching signaling between line level entities. Bytes D4–D12, 234–250 respectively are allocated for line data communication and should be considered as one 576 kilo byte per second message base channel that can be used for alarms, maintenance, control, monitoring, administration and communication needs between two (2) pieces of line terminating equipment. Bytes Z1 and Z2, 252 and 254 respectively are set aside for functions not yet defined. Byte E2, 256, is allocated as an order wire between line entities and is the equivalent of a voice frequency signal. As discussed above, this is equivalent to a single voice frequency channel.

The path overhead, 202, is assigned to, and transported with, the message payload. The path overhead bytes 202 are created when the payload is created by the originating path terminating equipment and are attached to the STS-1 message as part of the payload. When the payload is demultiplexed at the terminating path equipment the path overhead bytes are read and processed.

In the case of super rate services, only one set of path overhead is required and is contained in the first STS-1 message. The path overhead supports 4 classes of functions, Class A payload independent functions, Class B mapping dependent functions, Class C application specific functions, and Class D undefined functions reserved for future use.

Byte J1, byte 258, is a Class A function and is used by the receiving terminal to verify the path connection. Byte B3, byte 260, is a Class A function as allocated for path error monitoring. The path B3 byte is calculated over all bits of the previous STS payload before scrambling using a bit interleaved parity 8 code with even parity. Byte C2, byte 262, is an STS path signal label and is allocated to indicate the construction of the STS payload.

Byte G1, byte 264, is a Class A byte used to indicate path status and is allocated to convey back to an originating STS path terminating equipment the status and performance of the path terminating equipment. This feature permits the status and performance of the complete duplex path to be monitored at either end and at any point along the path.

Byte F2, byte 266, is a path user channel Class C and is allocated for user communications between path elements. For example, in a distributed Q dual bus application the F2 byte is used to carry distributed Q dual bus layer management information.

Byte H4, byte 268, is a VT multiframe indicator Class C and provides a generalized multiframe indicator for payload. Currently it is used only for virtual tributary structure payload. Bytes Z3, Z4, and Z5, bytes 270, 272, and 274 respectively are reserved for future functions.

Figure 3:
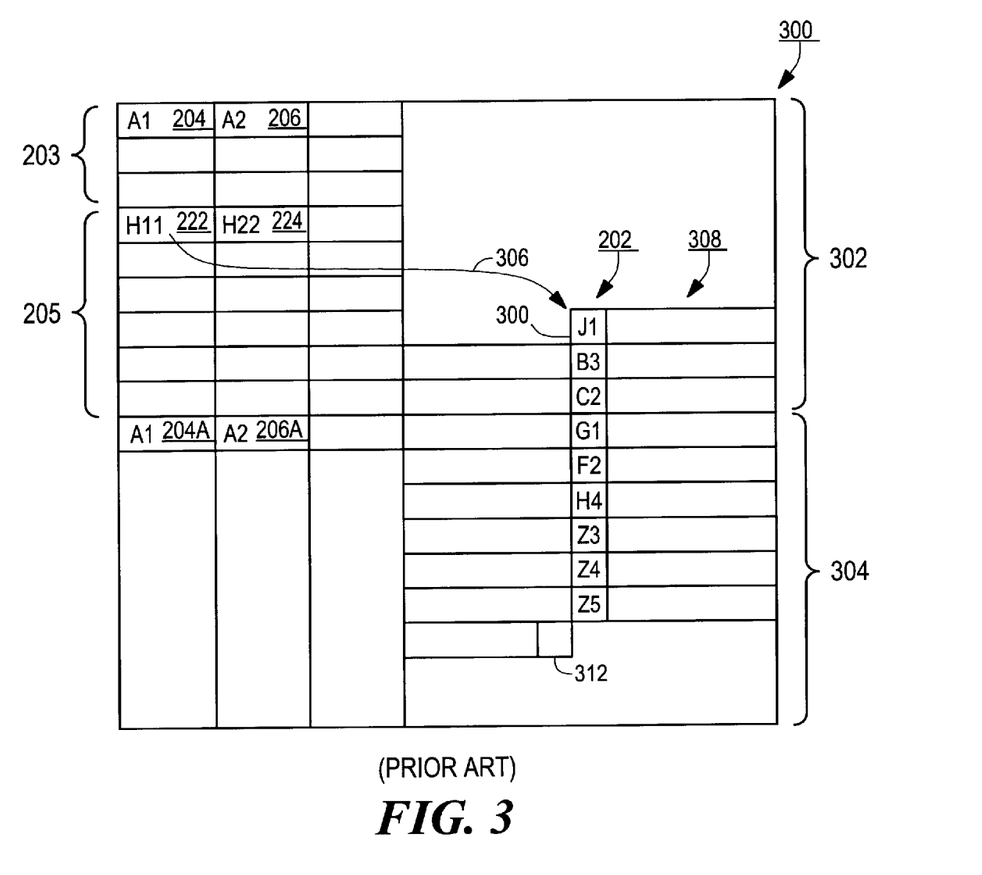
FIG. 3 is a schematic representation of an synchronized payload envelope (SPE) floating between two STS-1 message frames.

FIG. 3 illustrates a payload 308, referred to as the synchronous payload envelope (SPE), floating within its allotted space within the SONET frame structure 300. The pointer bytes H1, H2, and H3 222, 224, and 226 in the line overhead portion 205 of the SONET transport overhead provide the offset pointer 306 to point to the beginning byte 307 of the SPE 308. The SPE 308 then extends the equivalent of 9 rows of 87 bytes from the first byte 308 to the last byte 312. As illustrated in FIG. 3, the SPE 308 does not have to be framed within one individual STS-1 frame and as illustrated may overlap two (2) adjacent frames 302 and 304. However, the transport overhead bytes corresponding to the SPE 308 are framed within a single STS frame as illustrated.

Figure 4:
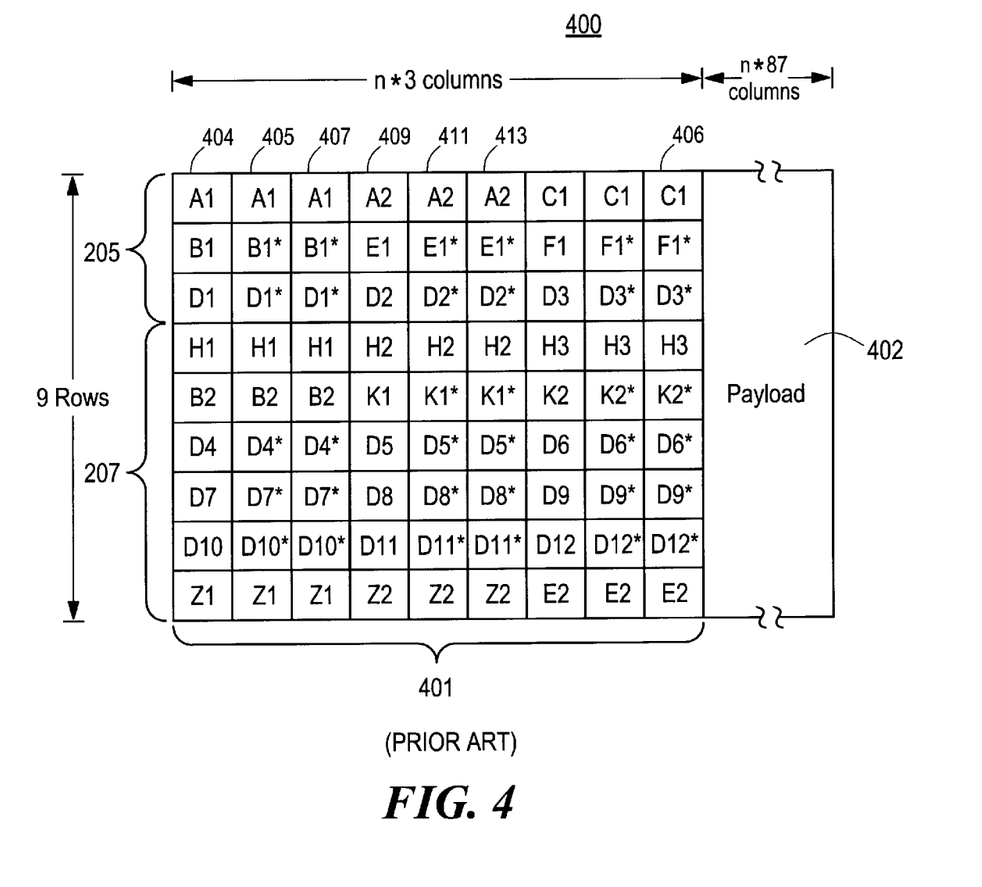
FIG. 4 is a schematic representation of the transport overhead of a byte-interleaved multiplexed STS-N message.

FIG. 4 illustrates a multiplexed SONET message using a byte interleaving process. As illustrated in FIG. 4, a multiplexed SONET message 400 includes a transport overhead that consists of N*3 columns 401, where in the illustrated embodiment in FIG. 4 N=3. Beginning with the first byte 404, which is the A1 byte of the first STS-1 SONET message, each byte of each successive STS-1 message is byte interleaved into the STS-N message. For example, as illustrated in FIG. 4 for N=3, the first 3 bytes in the STS-N message 404, 405, and 407 are the A1 bytes of the three individual STS-1 messages that are being multiplexed. Similarly, the next three bytes 409, 411, and 413 are the A2 bytes of each of the STS-1 messages that are being multiplexed into the STS-3 message. The last three bytes of the first row of the transport overhead ending in byte 406 are the three C1 bytes of each of the STS-1 messages that are being multiplexed into the STS-3 message. The payload bytes 402 which occur next are byte interleaved into the next N×87 columns in the same order. Each subsequent row is then filled in using generally the same byte interleave manner as described above.

However, although the transport overhead contains every byte from every STS-1 message overhead, not every byte in the transport overhead is utilized or defined as overhead for an STS-N message. As illustrated in FIG. 4 each overhead byte having an asterisk is not defined for that particular STS-N message, leaving these bytes as unused overhead. Thus, each STS-N message has both defined and undefined portions of bytes. As such, the defined portions of the transport overhead bytes are used to provide data necessary to the passage of the data through the network and the undefined bytes of the overhead are not used and may be redefined for other purposes.

Figure 5:
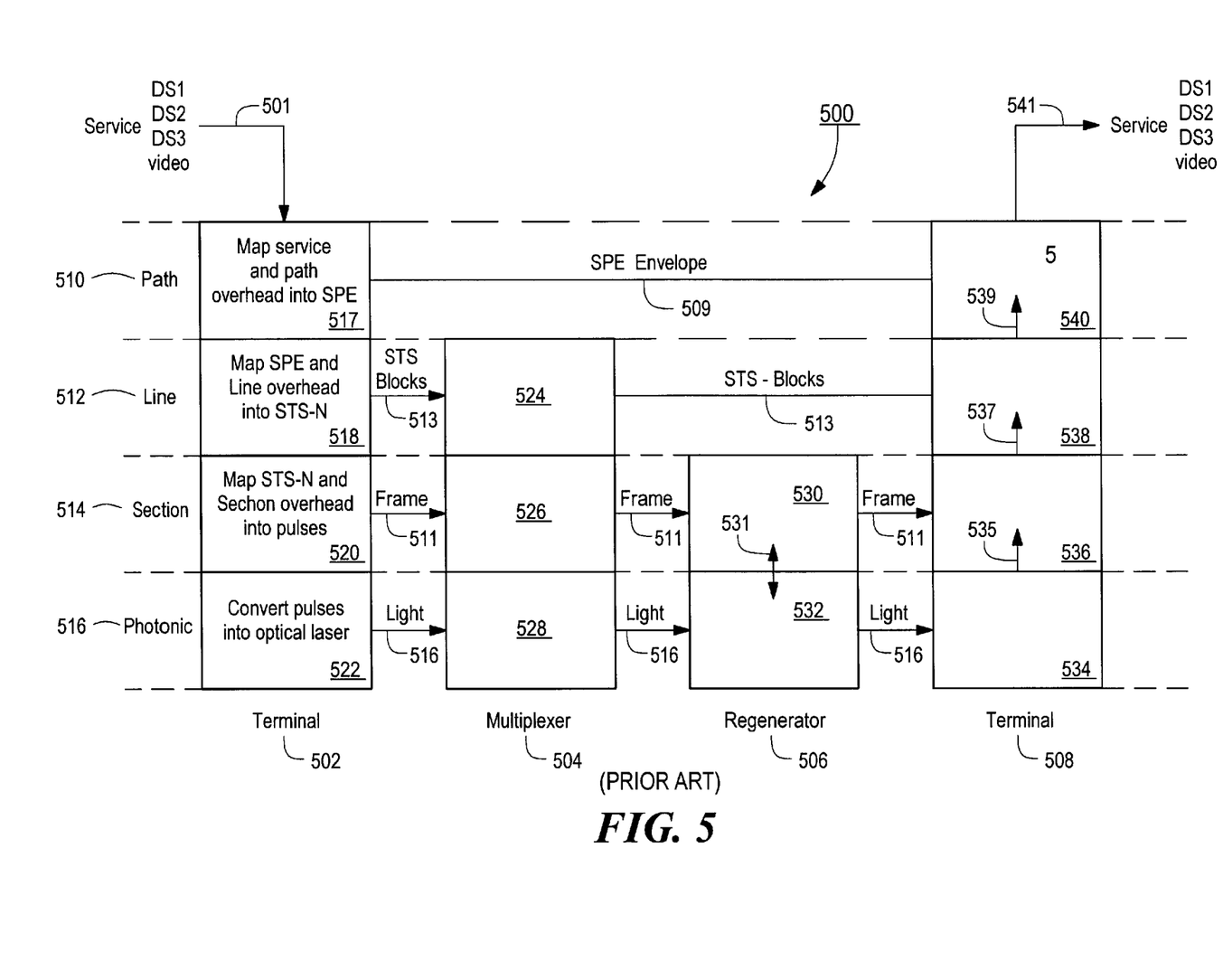
FIG. 5 is a block diagram illustrating the network layers and interactions in a SONET network.

FIG. 5 illustrates the basic SONET layers of a SONET connection. A SONET terminal 502 includes four (4) interface layers: a path layer 510, a line layer 512, a section layer 514, and a photonic layer 516. A basic SONET connection between a first terminal 502 and second terminal 508 is illustrated in FIG. 5. A service such as a DS-1, DS-2, DS-3 or video signal 501 is input into the path layer 510 of the first terminal 502. The path layer 510 appends the path overhead and maps the service data and path overhead into an SPE in the path terminating equipment 517. The service data, path overhead, and other data are then transferred to the line layer 512, which maps the SPE and line overhead bytes into an STS-N multiplexed signal in line terminating equipment 518. The multiplexed STS-N signal is then passed to the section terminating equipment 520 that maps the STS-N multiplexed signal and section overhead into electronic pulses. These pulses are passed to the photonic layer 516 equipment 522 that converts the electrical pulses into optical laser pulses.

In the illustrative example, the light pulses are transmitted from terminal 502 to a first multiplexer 504. The multiplexer 504 receives the optical pulses by the photonic equipment 528 contained therein. Framing information 511 is received in the section terminating equipment 526 within the multiplexer and used to reframe the SONET messages as other messages are multiplexed into the STS message. The STS blocks 513 are received in line terminating equipment 524 and are multiplexed together with other STS messages received by the multiplexer 504. These multiplexed messages are passed down to the section equipment 526 for framing and after framing the electrical pulses are provided to the photonic level equipment 528 for retransmission into the SONET network. The photonic pulses may be passed to one or more regenerators 506 that receive the photonic pulses at the photonic equipment level 532 and reframe the STS-N message in the section equipment 537. The regenerator 506 retransmits the newly framed and regenerated photonic pulses back to the SONET network. These photonic pulses are then passed through the SONET network, possibly passing through other mulitplexers, regenerators, or other equipment within the SONET network. When the photonic pulses arrive at the receiving terminal 508, the photonic equipment 534 of the second terminal 508 receives the photonic pulses and converts them into electrical pulses. These electrical pulses are provided to the section terminal equipment 536, which identifies the framed STS-N messages, performs error calculations, provides the payload 104 and line overhead to the line terminating equipment 538. The line terminating equipment 538 demultiplexes the STS-N signal and provides the demultiplexed messages to the path terminating equipment 540. The path terminating equipment 540 then provides the various non-SONET data, DS1, DS2, DS3 and video on output line 541.

Figure 6:
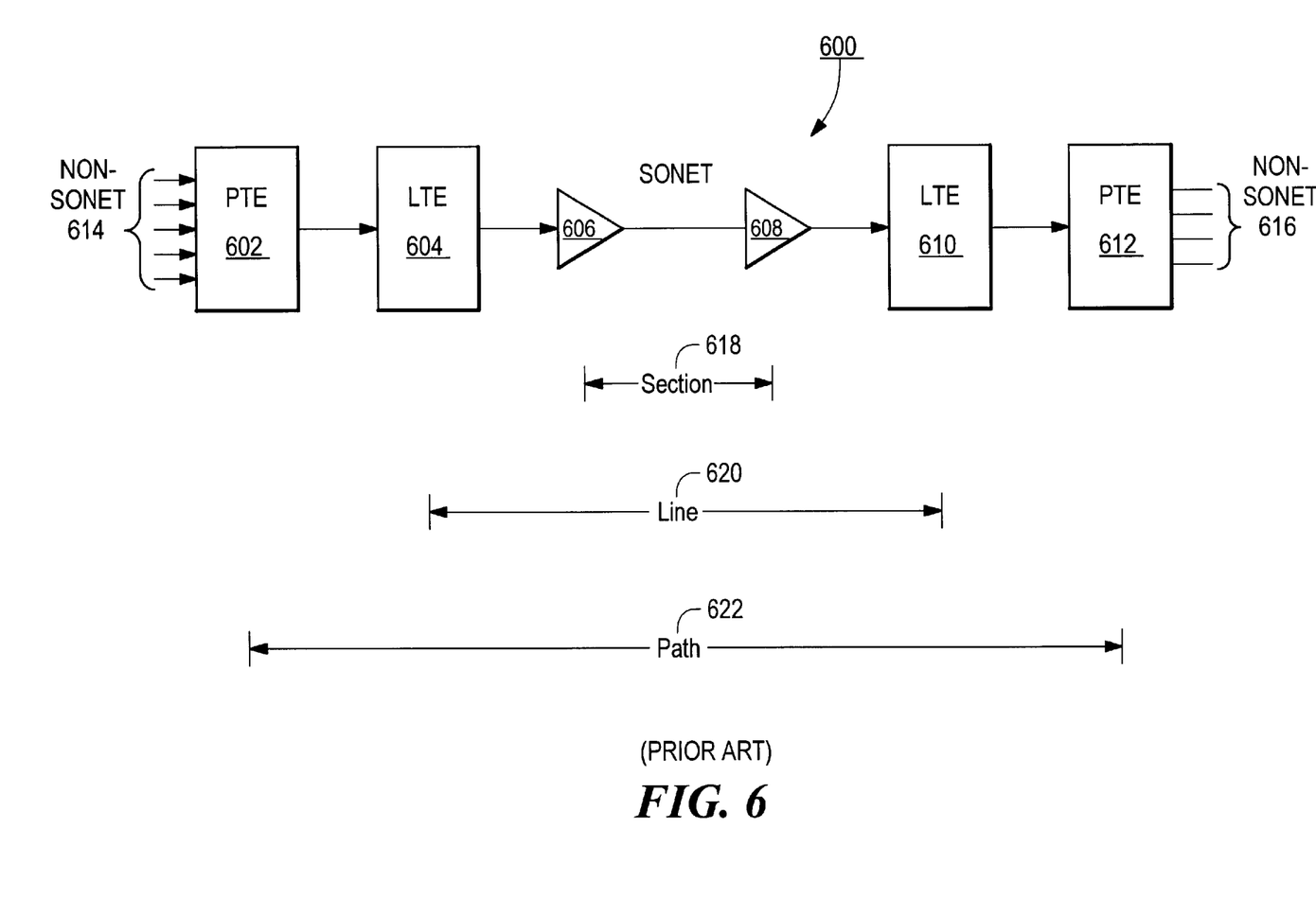
FIG. 6 is a block diagram illustrating the hierarchical nature of a SONET network.

FIG. 6 illustrates a basic SONET hierarchy in which path terminating equipment 602 receives non SONET signal 614. The path terminating equipment 602 converts these non SONET signals into SONET signals and passes them to a line terminating equipment 604. The line terminating equipment 604 passes these signals to section terminating equipment 606 which transmits the signals over a SONET network to receiving section terminating equipment 608. Thus a section 618 of the transmission of a SONET message occurs between section terminating equipment 606 and 608.

Receiving line terminating equipment 610 receives the electrical pulses from the section terminating equipment 608, converts them into individual SONET messages for a path terminating equipment 612 to convert to non SONET messages 616. Thus the line section of a SONET transmission occurs between line terminating equipment 604 and 610 and similarly the path of a SONET message occurs between path terminating equipment 602 and 612.

In some applications, it may be desirable for a client to know the condition of the network over which its data travels, and to know if any errors have occurred during the transmission of their data. For example a client may wish to know if an out-of-frame (OOF) error has occurred during transmission in order to assess the quality of the SONET network or to assess whether any of the links within the SONET network that the data has passed through were defective. However, since OOF signaling occurs within the Section layer, any OOF error generated would impact all data traffic occurring within that section. If an OOF error were to be propagated throughout the network based on the data of one client, the data of other clients would generally be affected and portions of the SONET network could be adversely affected as well.

To allow for the notification of a client that an OOF error occurred during the transmission of their data through the SONET network, a subset of the transport overhead bytes may be used. In one embodiment a subset or portion of the framing bytes of the transport overhead may be used to indicate if an OOF error has occurred. Under normal circumstances, in a standard STS-N message, all of the A1 and A2 framing bytes are defined in an STS-N message overhead and are used to frame the constituent STS-1 messages. However, it is possible to provide the necessary framing information for an STS-N message using less than all of the A1 and A2 overhead framing bytes.

Figure 7:
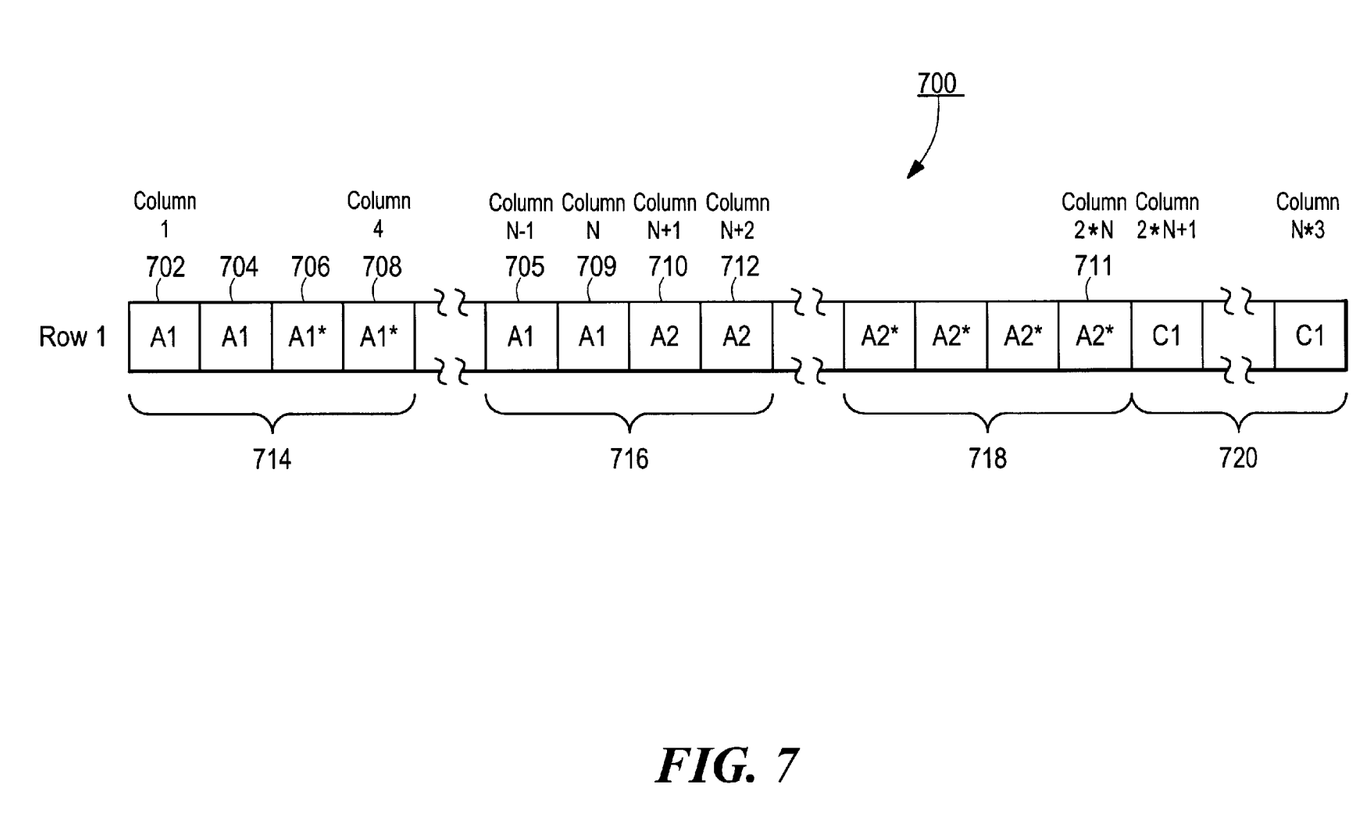
FIG. 7 is a schematic representation of the use of framing bytes to indicate an out-of-frame error condition according to one aspect of the present invention.

FIG. 7 illustrates one embodiment in which only the last two A1 bytes 705, 709 and the first two A2 bytes 710, 712, framing byte group 716, are used to provide the framing signals for an STS-N message. Framing is accomplished by detecting the transition between the last two A1 bytes and the first two A2 bytes. Typically a finite state machine is employed to constantly look for a predetermined pattern of the four bytes. Once this predetermined pattern is identified, indicia is provided that a new frame has started. The other framing bytes are not terminated by the section or line terminating equipment, and thus, may be redefined for other purposes. The N-A1 bytes are placed in the first N columns of row 1 of the transport overhead section of the STS-N message. The transport overhead contains the A1 framing bytes for each STS-1 message multiplexed into the STS-N message beginning with column 1 702 and extending through column N 709. The transport overhead also contains the A2 framing bytes for each STS-1 message multiplexed into the STS-N message beginning in column N+1 710 and extending through column 2*N 711. The remaining columns in the first row of the transport overhead are taken up by the C1 bytes of each STS-1 message multiplexed into the STS-N message.

As discussed above, the framing data for the STS-N message are contained in the last two A1 bytes-in column N−1 and column N-along with the first two A2 framing bytes-in columns N+1 and N+2 respectively. These four bytes are collectively referred to as framing bytes 716 and are utilized to provide framing for the entire STS-N message. In the illustrated embodiment, the first four A1 bytes extending from column 1 702 through column 4 708 respectively are referred to as byte group 714. The four bytes contained within byte group 714 are utilized to indicate whether an out of frame error has occurred during transmission of the STS-N message.

In the illustrated embodiment in FIG. 7 the first byte group 714 is set into a first predetermined pattern that indicates no out of frame error has occurred when the STS-N message is formed. During transmission of this message through a SONET network, if an out of frame error is detected the first four bytes 714 are then set to a second predetermined pattern that indicates that an out of frame error has occurred. When the STS-N message is received from the SONET network, the first byte group 714 is read and the pattern of the bytes is detected. In the event that the first byte group 714 indicates that an out of frame error has occurred during transmission, the receiving equipment notifies the client by generating a plurality of invalid framing bytes for each of the plurality of client data contained in the outgoing STS-1 messages obtained from the STS-N message. In the event that the first bytes 714 are in the first predetermined pattern indicating that no out of frame error has occurred during transmission, the receiving equipment generates a plurality of valid framing bytes for each of the plurality of client data contained in the outgoing STS-1 messages.

In the instance in which the client data of the client wishing to be notified of OOF errors is multiplexed with another one or more streams of other client data, the OOF signaling follows only the client data of the client wishing to be notified of OOF errors in order to prevent other clients from having their data corrupted. The OOF signaling includes information on which STS-1 messages are affected by the OOF. As the data is multiplexed and demultiplexed the information added to each STS-1 message affected by the OOF is inserted in the new frames to indicate which of the multiplexed STS-1 messages are affected.

Other bytes in the transport overhead may be used for OOF signaling as well. For example, as illustrated in FIG. 4 other bytes in the section overhead 205 are not defined and could be used to transport the indicia of an existing OOF as well.

A network client may also wish to be provided with data relevant to the quality of the various links within the network through which their data passes. The client may wish to measure the number of errors that occur in a message to determine the bit error rate of the transmission. As discussed above, the B2 bytes contained in the transport overhead of an STS-N message are used to provide parity information to detect errors that occur during transmission of the client data through the network. However, the B2 bytes only indicate the errors that occur between two pieces of line terminating equipment. A SONET network includes line terminating equipment within it to provide add/drop multiplexing and other line designated function. It may be desirable to provide a client with the appearance that no other data is multiplexed with their data, and that only a single connection is used to provide the necessary connectivity between the client terminals. In this way, it would appear to the client that any error data or other network data would be applicable to their data only. In order to allow a client to determine the bit errors that occur between the ingress and egress of the network, the bit errors that occur between each piece of line terminating equipment between ingress and egress points for the client data must be aggregated together.

In order to allow the bit error data from multiple line segments to be aggregated together, the line terminating equipment contained within the network must be able to forward error information from one line segment to the next. It does this by reading the B2 data, operating on this data, and writing the various B2 byte(s) using the operated-on data. In one embodiment illustrated in FIG. 8, line equipment 803 of the terminal 802 performs a parity calculation and writes the appropriate data to the B2 bytes in the line overhead of the message as illustrated in block 814. This message is then passed through various nodes within a SONET network 812. In this embodiment, each LTE node within the SONET network 812 is capable of aggregating bit parity errors and forwarding the aggregated errors to the next node. At the network ingress node 804, which may be for example a multiplexer, a parity error check will be performed by the line terminating equipment 820. In order to aggregate the errors throughout the network the B2 data is operated upon at each node within the SONET network 812 having line terminating equipment. The current B2 bytes are read by B2 read logic 822 and an error mask is generated from these bytes by parity check logic 824. The error mask for each STS-1 message has a width of one byte and has a "1" in a position where the corresponding BIP-8 check detected an error. Alternatively, a "0" could be used to indicate the position where the corresponding BIP-8 check detected an error. Parity generator 826 performs a new parity calculation of the bytes of the outgoing and reframed STS-N message, and new B2 bytes are provided, along with the error mask bytes, to an Exclusive OR block 828. The result of the Exclusive OR is then written into the B2 bytes in the line overhead of the outgoing STS-N message. Note that using this technique, invalid parity bytes are generated when the error mask is non-zero.

Figure 8:
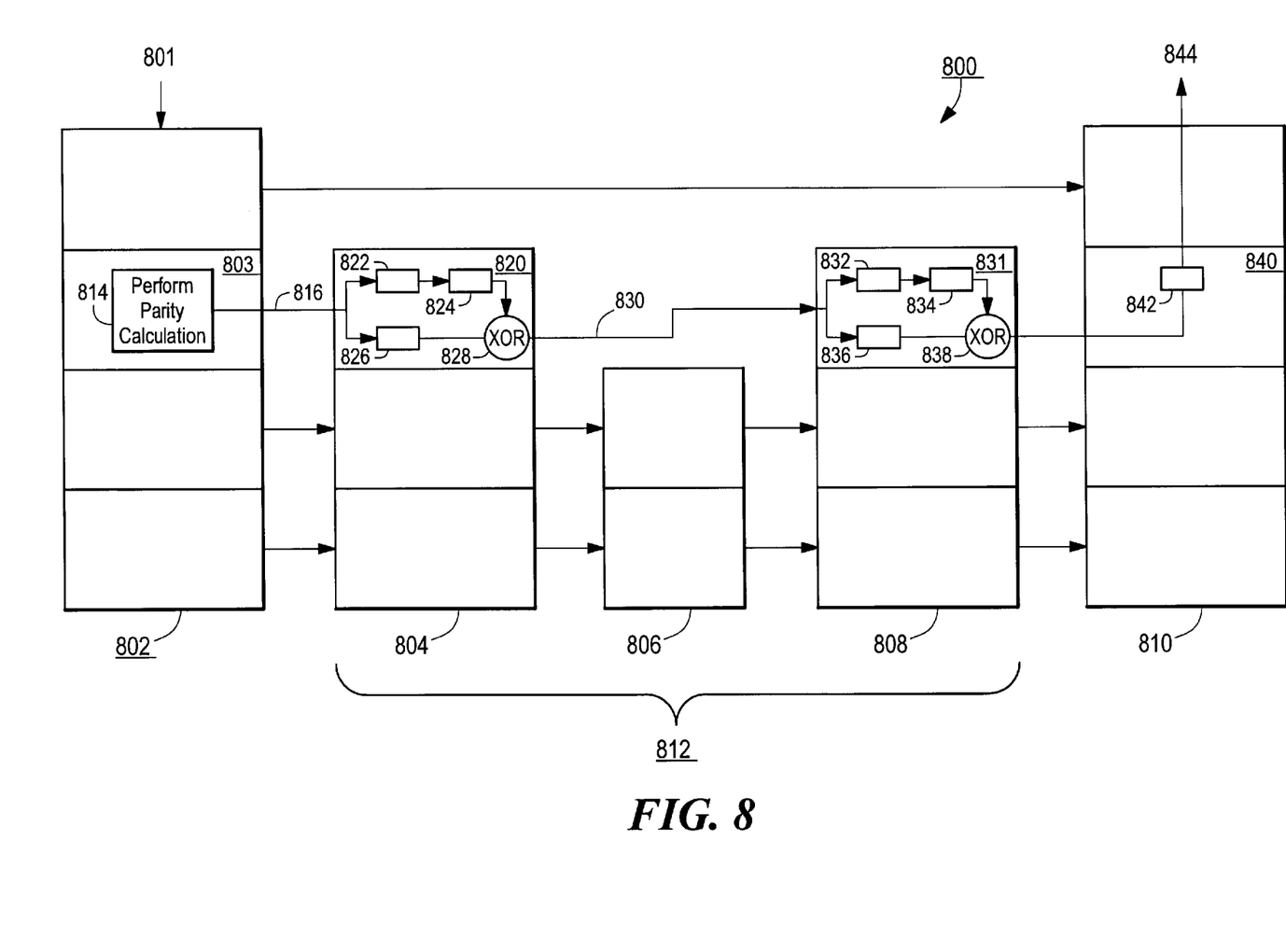
FIG. 8 is a block diagram illustrating the aggregation of byte parity errors according to another aspect of the present invention.

At the network egress node 808, the STS-N message is received and a similar process occurs. The current B2 bytes are read by B2 read logic 832 and an error mask is generated by parity check logic 834 from these bytes. The error mask for each STS message has a width of one byte and has a "1" in a position where the corresponding BIP-8 check detected an error. Alternatively, a "0" could be used to indicate the position where the corresponding BIP-8 check detected an error. Parity generator 836 performs a new parity calculation of the bytes of the outgoing and reframed STS-N message and new B2 bytes are provided, along with the error mask bytes, to an Exclusive OR block 838. The result of the Exclusive OR is then written into the B2 bytes in the line overhead section of the outgoing STS-N message. Note that using this technique invalid parity bytes are generated when the error mask is non-zero.

Line equipment 840 at the client terminal 810 detects errors in the B2 bytes using B2 read logic 842. In this way errors that occurred during transmission are aggregated together and the client may determine the bit error rate of the STS-N messages carrying the client data.

As illustrated in FIG. 8, a regeneration node 806 does not examine the line overhead and performs no parity checking. B2 bytes are thus passed transparently through regenerator 806 to terminal 808.

It may be desirable to carry error data across a network segment in which errors are not, or can not, be aggregated. Thus, in another embodiment illustrated in FIG. 9, a second method of aggregating bit errors that occur during transmission through the SONET network is provided.

Figure 9:
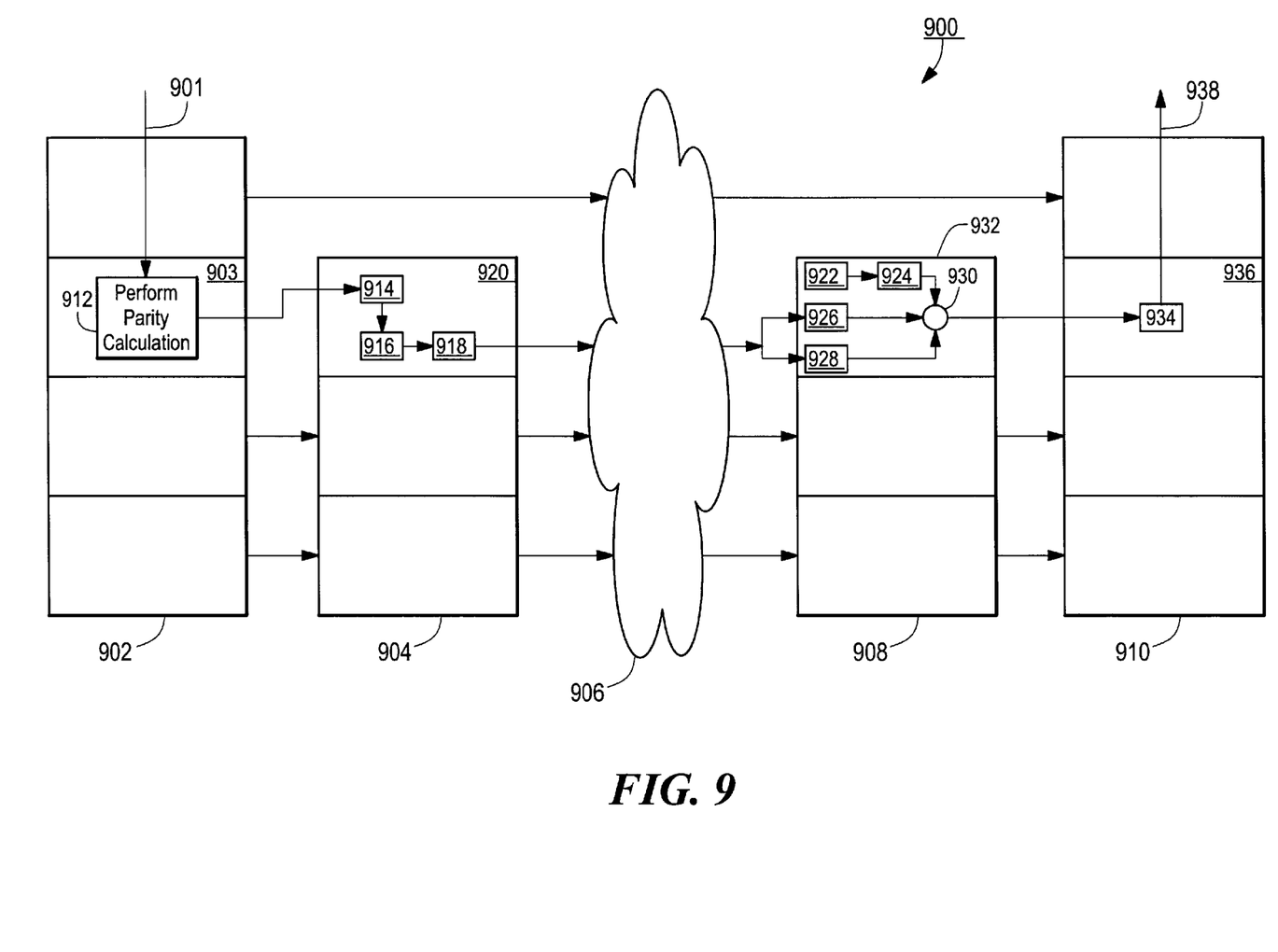
FIG. 9 is a block diagram illustrating the aggregation of byte parity errors according to another aspect of the present invention.

A message 901 is input to a transmitting terminal 902. The line equipment 903 of the transmitting terminal 903 performs a parity calculation 912 on the STS-1 message when it is formed. This STS-1 message is passed to a network node 904, which can be a multiplexer or other piece of node equipment having line terminating equipment 920. The line terminating equipment 920 of node 904, parity check logic 914 performs a parity check, creates an error mask and store logic 916 stores the error mask in unused overhead bytes. Note that the error mask that is stored in the unused overhead bytes is independent of the overhead bytes and is not normally a component thereof Parity generator 918 performs a parity calculation on the output and reframed STS-N message 918.

The message is then passed through a network 906 comprising a plurality of nodes which do not aggregate detected message parity errors, and does not corrupt the error mask stored in the unused and undefined overhead bytes of the STS-N message. The egress node 908, which includes line terminating equipment 932, receives the STS-N message and the read B2 logic 922 reads the B2bytes and parity check logic 924 performs a parity bit error check on the received message and provides an error mask to the Exclusive OR module 930. Restore logic 928 reads the error mask stored in the unused overhead bytes and provides this stored error mask to the Exclusive OR module 930. In addition, the parity generator 926 performs a bit parity calculation on the outgoing and reframed STS-N message and provides the results to the Exclusive OR module 930 as well.

In one alternative embodiment, a logical OR operation is preformed on the bit error mask read by the restore logic from the unused overhead bytes and the error mask formed by the existing B2 error byte and parity check logic 924. The results of this OR operation is then combined with the new bit parity calculation on the outgoing and reformed STS-N message using an Exclusive OR operation.

In another alternative embodiment, the number of ones in each mask are counted and the total number of ones are then written into the new error mask.

The results of the Exclusive OR module 930 are the outgoing B2 bytes and are provided to the receiving terminal 910. The client terminal 910 includes line equipment 936 and in particular B2 read logic 934 that detects the aggregated parity errors provided by the node 908. In this way the number of errors during the transmission of the STS-N message as it traveled through the ingress terminal and egress terminal may be calculated based on the results the performed exclusive error or operation.

Alternatively, the error mask may be written to a portion of the defined and used overhead portion of the message that has been redefined as described above with reference to the out of frame error indicating bytes.

As discussed above, the error mask created when the STS-N message was formed may be stored in an undefined portion of the transport overhead, preferably in the line overhead portion, or in a defined portion of the transport overhead that has been redefined to hold the error mask. Any overhead byte may be used so long as the byte is passed through the network unchanged, and the client is not using that particular byte for their own signaling. For example, the D1 and D2 bytes from STS-2 to STS-48 may be used to store the error mask.

Those of ordinary skill in the art should further appreciate that variations to and modification of the above-described methods for transparent multiplexing of SONET streams may be made without departing from the inventive concepts disclosed herein. Accordingly, the invention should be viewed as limited solely by the scope spirit of the appended claims.

What is claimed is:

1. A method for detecting an out-of-frame error during transmission of a message through a communications network, the message including a plurality of client provided data combined together into a message and formatted into a message format, the message format including a plurality of overhead bytes including a plurality of framing bytes and the communications network including a plurality of nodes connected via a plurality of links, the method comprising the steps of:

selecting a predetermined number of the plurality of framing bytes as out-of-frame error indicator bytes;

setting the out-of-frame error indicator bytes of the message to a first pattern indicative that no out-of-frame error has occurred;

transmitting the message into the communications network;

detecting an out-of-frame error;

in the event of the detection of an out-of-frame error during the transmission of the message through the network, setting the out-of-frame error indicating bytes of the message to a second predetermined pattern indicative of an out-of-frame error occurring;

receiving the framing bytes of the message from the communications network and detecting the out-of-frame error indicating bytes of the message;

reading the out-of-frame error indicating bytes of the message to determine whether they are set to the second predetermined pattern; and in the event that the out-of-frame error indicating bytes of the message are set to the second predetermined byte pattern notifying the client that an out-of-frame error has occurred, generating a plurality of invalid framing bytes for the message; and in the event that the out-of-frame error indicating bytes of the message are in the first predetermined byte pattern indicative that no out-of-frame error occurred during transmission, generating a plurality of valid framing bytes for each of the plurality of client data.

2. The method of claim 1 wherein the plurality of overhead bytes includes a defined portion and an undefined portion of bytes, and wherein the step of selecting a predetermined number of the plurality of overhead bytes to indicate if an out-of-frame error occurs includes selecting a predetermined number of the undefined portion of the plurality of overhead bytes.

3. The method of claim 1 wherein the plurality of overhead bytes includes a defined portion and an undefined portion of bytes, and wherein the step of selecting a predetermined number of the plurality of overhead bytes to indicate if an out-of-frame error occurs includes selecting a first predetermined subset of the defined portion of the plurality of overhead bytes that provide message framing;

and further including setting a second predetermined subset of the defined portion of the plurality of overhead bytes that indicates message framing to a first framing pattern; and setting the first predetermined subset of the defined portion of the plurality of overhead bytes that indicates message framing to the first pattern indicating that no out-of-frame error occurs.

4. The method of claim 1 wherein the plurality of overhead bytes includes a section overhead portion and a line overhead portion and wherein each of the section overhead portion and the line overhead portion include a defined and an undefined portion, and wherein the step of selecting a predetermined number of the plurality of overhead bytes to indicate if an out-of-frame error occurs further comprising the steps of:

selecting a predetermined number of the undefined portion of the section overhead portion of overhead bytes; and in the event of the detection of an out-of-frame error during the transmission of the message through the network, setting the predetermined number of the undefined portion of the section overhead portion of the plurality of overhead bytes indicative of an out-of-frame error to the second predetermined pattern indicative of an out-of-frame error occurring.

5. The method of claim 1 wherein the plurality of overhead bytes includes a section overhead portion and a line overhead portion and wherein each of the section overhead portion and the line overhead portion include a defined and an undefined portion, wherein the step of selecting a predetermined number of the plurality of overhead bytes to indicate if an out-of-frame error occurs comprises the steps of:

selecting a first predetermined subset of the defined portion of the plurality of section overhead bytes that indicate message framing;

selecting a second predetermined subset of the defined portion of the plurality of section overhead bytes that indicate message framing;

setting the second predetermined subset of the defined portion of the section overhead portion of the plurality of overhead bytes that indicate message framing to a first framing pattern;

setting the first predetermined subset of the defined portion of the section overhead portion of the plurality of overhead bytes that indicates message framing to the first pattern indicating that no out-of-frame error occurs; and in the event that an out-of-frame error occurs during the transmission of the client data through the network, setting the first predetermined number subset of the defined portion of the section overhead portion of the plurality of overhead bytes indicative of an out-of-frame error occurring to a second pattern indicative that an out-of-frame error has occurred.

6. A method for detecting errors during transmission of a message through a communications network, the message including a plurality of client provided data combined together into a message and formatted into a message format, the message format including a plurality of overhead bytes that includes a plurality of parity check bytes and the communications network including a plurality of nodes connected via a plurality of links, the method comprising the steps of:

performing a parity calculation on the message;

calculating a parity check byte value for each of the plurality of parity check bytes;

setting each of the parity check bytes of the message to the corresponding calculated value;

transmitting the message into the network;

at a node within the network through which the message passes:

reading each of the plurality of parity check bytes at each node the message passes through within the network;

forming an error mask based on the values of the plurality of parity check bytes;

performing a new parity check of the message;
calculating new parity check byte values for each of the plurality of parity check bytes;
performing an Exclusive OR operation between the error mask and the new calculated parity check byte values;
writing each of the parity check bytes to the values resulting from the Exclusive OR performed between the error mask and the new calculated parity check byte values.

7. The method of claim 6 wherein the plurality of overhead bytes includes a section overhead portion and a line overhead portion and wherein each of the section overhead portion and the line overhead portion include a defined and an undefined portion, and wherein the step of setting each of the parity check bytes of the message to the corresponding calculated value includes:

selecting at least one unused byte in the undefined portion of the line overhead portion of the plurality of overhead bytes;
forming an error mask based on the calculated values of each of the parity check bytes; and
writing the error mask to the selected at least one unused byte in the undefined portion of the overhead bytes.

8. The method of claim 6 wherein the plurality of overhead bytes includes a section overhead portion and a line overhead portion and wherein each of the section overhead portion and the line overhead portion include a defined and an undefined portion, and wherein the step of writing the each of the parity check bytes to the corresponding value includes:

selecting at least one byte in the defined portion of the line overhead portion of the plurality of overhead bytes indicative of the parity of the message;
forming an error mask based on the calculated values of each of the parity check bytes; and
writing the error mask to the selected at least one unused byte in the undefined portion of the overhead bytes.

9. A method for detecting errors during transmission of a message through a communications network, the message including a plurality of client provided data combined together and formatted into a message format, the message format including a plurality of overhead bytes that includes a plurality of parity check bytes and the communications network including a plurality of nodes connected via a plurality of links, the method comprising the steps of:

performing a parity calculation on the message;
calculating a parity check byte value for all the parity check bytes;
storing the parity check bytes to the corresponding calculated value;
forming a first error mask based on the values of the parity check bytes;
storing the error mask in an unused portion of the plurality of overhead bytes;
transmitting the message into the communications network;
receiving the message from the communications network;
reading the parity check bytes;
performing a new parity check of the message;
calculating new parity check byte values for all the parity check bytes;
creating a second error mask based on the new parity check byte values;
reading the first error mask from the unused portion of the plurality of overhead bytes;
performing an Exclusive OR operation between the first error mask, the second error mask and the new calculated parity check byte values; and
determining the number of errors in the transmission of the message based on the results of the performed Exclusive OR operation.

10. The method of claim 9 wherein the plurality of overhead bytes includes a section overhead portion and a line overhead portion and wherein each of the section overhead portion and the line overhead portion include a defined and an undefined portion, and wherein the step of storing the each of the parity check bytes to the corresponding value includes the steps of:

selecting at least one unused byte in the undefined portion of the line overhead portion of the plurality of overhead bytes; and
writing the selected at least one unused byte to the corresponding calculated value.

11. The method of claim 9 wherein the plurality of overhead bytes includes a section overhead portion and a line overhead portion and wherein each of the section overhead portion and the line overhead portion include a defined and an undefined portion, and wherein the step of storing the each of the parity check bytes to the corresponding value includes the steps of:

selecting at least one byte in the defined portion of the line overhead portion of the plurality of overhead bytes indicative of the parity of the message; and
writing the selected at least one byte in the defined portion of the line overhead portion to the corresponding calculated value.

12. A method for detecting errors during transmission of a message through a communications network, the message including a plurality of client provided data combined together and formatted into a message format, the message format including a plurality of overhead bytes that includes a plurality of parity check bytes and the communications network including a plurality of nodes connected via a plurality of links, the method comprising the steps of:

performing a parity calculation on the message;
calculating a parity check byte value for all the parity check bytes;
storing the parity check bytes to the corresponding calculated value;
forming a first error mask based on the values of the parity check bytes;
storing the error mask in an unused portion of the plurality of overhead bytes;
transmitting the message into the communications network;
receiving the message from the communications network;
reading the parity check bytes;
performing a new parity check of the message;
calculating new parity check byte values for all the parity check bytes;
creating a second error mask based on the new parity check byte values;
reading the first error mask from the unused portion of the plurality of overhead bytes;
performing a logical OR operation between the first error mask and the second error mask;
performing an Exclusive OR operation between the results of the OR operation and the new calculated parity check byte values; and determining the number of errors in the transmission of the message based on the results of the performed Exclusive OR operation.

13. The method of claim 12 wherein the plurality of overhead bytes includes a section overhead portion and a line overhead portion and wherein each of the section overhead portion and the line overhead portion include a defined and an undefined portion, and wherein the step of storing the each of the parity check bytes to the corresponding value includes the steps of:

selecting at least one unused byte in the undefined portion of the line overhead portion of the plurality of overhead bytes; and writing the selected at least one unused byte to the corresponding calculated value.

14. The method of claim 12 wherein the plurality of overhead bytes includes a section overhead portion and a line overhead portion and wherein each of the section overhead portion and the line overhead portion include a defined and an undefined portion, and wherein the step of storing the each of the parity check bytes to the corresponding value includes the steps of:

selecting at least one byte in the defined portion of the line overhead portion of the plurality of overhead bytes indicative of the parity of the message; and writing the selected at least one byte in the defined portion of the line overhead portion to the corresponding calculated value.

* * * * *